US012803132B2

(12) United States Patent
Machida et al.

(10) Patent No.: US 12,803,132 B2
(45) Date of Patent: Nov. 17, 2026

(54) BATTERY AND METHOD FOR PRODUCING THE BATTERY

(71) Applicants: PRIMEARTH EV ENERGY CO., LTD., Kosai (JP); TOYOTA JIDOSHA KABUSHIKI KAISHA, Toyota (JP); PRIME PLANET ENERGY & SOLUTIONS, INC., Tokyo (JP)

(72) Inventors: Keitaro Machida, Hamamatsu (JP); Masaya Ogura, Hamamatsu (JP); Akinori Kokubo, Toyohashi (JP); Yuya Tanaka, Toyohashi (JP); Koichi Tanimoto, Takaraduka (JP)

(73) Assignees: TOYOTA BATTERY CO., LTD., Kosai (JP); PRIME PLANET ENERGY & SOLUTIONS, INC., Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 594 days.

(21) Appl. No.: 18/233,926

(22) Filed: Aug. 15, 2023

(65) Prior Publication Data

US 2024/0079742 A1 Mar. 7, 2024

(30) Foreign Application Priority Data

Sep. 5, 2022 (JP) ................................ 2022-140737

(51) Int. Cl.

*H01M 50/557* (2021.01)
*H01M 50/103* (2021.01)

(Continued)

(52) U.S. Cl.

CPC ....... *H01M 50/557* (2021.01); *H01M 50/103* (2021.01); *H01M 50/176* (2021.01); *H01M 50/533* (2021.01); *H01M 50/567* (2021.01)

(58) Field of Classification Search

CPC ............ H01M 50/557; H01M 50/567; H01M 50/176; H01M 50/533; H01M 50/103; H01M 50/564; H01M 10/38; H01M 10/04

(Continued)

(56) References Cited

FOREIGN PATENT DOCUMENTS

JP H07-183024 A 7/1995
JP 2016-054109 A 4/2016

(Continued)

*Primary Examiner* — Allison Bourke
*Assistant Examiner* — Robert Gene West
(74) *Attorney, Agent, or Firm* — Oliff PLC

(57) ABSTRACT

A battery includes a current collecting member connected to a power generating element housed in an outer casing with a lid, and a rivet placed outside the outer casing. The current collecting member includes a plate-shaped portion placed along the lid. The rivet includes a through part extending through the lid, and a contact part contacting a first surface of the plate-shaped portion. A part of a peripheral end portion of the contact part is joined to the first surface. An edge portion of a non-joined portion of the peripheral end portion, facing the first surface, includes a tapered surface generating a gap smaller at a position closer to the through part. The tapered surface has a maximum size of 0.1 mm or more in a direction from the peripheral end portion to the through part and 0.03 mm or more in a thickness direction of the peripheral end portion.

4 Claims, 9 Drawing Sheets

(51) Int. Cl.
*H01M 50/176* (2021.01)
*H01M 50/533* (2021.01)
*H01M 50/567* (2021.01)

(58) Field of Classification Search
USPC .......................................................... 429/178
See application file for complete search history.

(56) References Cited

FOREIGN PATENT DOCUMENTS

| | | | | | |
|---|---|---|---|---|---|
| KR | 101250093 | B1 * | 4/2013 | ............. | B21K 25/00 |
| WO | WO-2017110480 | A1 * | 6/2017 | .......... | H01M 50/574 |

* cited by examiner

BATTERY AND METHOD FOR PRODUCING THE BATTERY

CROSS-REFERENCE TO RELATED APPLICATIONS

This application is based upon and claims the benefit of priority to Japanese Patent Application No. 2022-140737 filed on Sep. 5, 2022, the entire contents of which are incorporated herein by reference.

BACKGROUND

Technical Field

The present disclosure relates to a battery and a method for producing the battery.

Related Art

Conventionally, there are known batteries in each of which a current-collecting member connected to a power-generating element housed in an outer casing and an external terminal placed outside the outer casing are connected by a rivet-shaped member. For example, Japanese unexamined patent application publication No. 2016-054109 (JP2016-054109A) discloses a battery in which a protruding portion of an internal terminal is inserted into a through hole of an external terminal and swaged. This publication JP2016-054109A discloses the internal terminal whose protruding portion has a hollow cylindrical distal end portion with a cutout formed to midpoint in the cylindrical portion.

SUMMARY

Technical Problems

The conventional arts described above have the following problems. To reliably connect constituent members by joining them, it is necessary to precisely identify the boundary position between the members to be joined. For example, it is conceivable to take an image of target parts of the members to be joined and its surroundings, and identify a joining target site. However, the boundary of the members may not always clearly appear in the captured image depending on the shape of each member before joining. If the joined site deviates from the boundary of the members, a battery may be produced in which the constituent members are unstably connected.

The present disclosure has been made to address the above problems and has a purpose to provide a battery in which constituent members are appropriately joined at their boundaries, and provide a method for producing the battery.

Means of Solving the Problems

To achieve the above-mentioned purpose, one aspect of the present disclosure provides a battery comprising: an outer casing; a power generating element housed in the outer casing; a first current collecting member connected to the power generating element; and a second current collecting member placed outside the outer casing, wherein either one of the first current collecting member and the second current collecting member includes a plate-shaped portion that has a first surface and a second surface opposite the first surface, and the plate-shaped portion is placed along the outer casing with the second surface facing the outer casing, and the other one of the first current collecting member and the second current collecting member includes: a through part extending through the outer casing; and a contact part provided continuous to the through part and in contact with the first surface of the plate-shaped portion, the contact part includes a peripheral end portion that is located apart from the through part and includes a portion joined to the first surface of the plate-shaped portion, the peripheral end portion further includes a non-joined portion not joined to the first surface of the plate-shaped portion, the non-joined portion including an edge portion located on a side facing the first surface and provided with a tapered surface generating a gap with respect to the first surface so that the gap is smaller at a position closer to the through part, the tapered surface has a maximum size that is: 0.1 mm or more in a direction from the peripheral end portion toward the through part; and 0.03 mm or more in a thickness direction of the peripheral end portion.

In the battery configured as above, the first surface of either the first current collecting member or the second current collecting member is joined in contact with the contact part of the other one, the first current collecting member or the second current collecting member, and they are reliably electrically connected to each other. In contrast, for the non-joined portion of the peripheral end portion, the edge portion of the peripheral end portion of the contact part is provided with the tapered surface, so that a gap is formed between the peripheral end portion and the first surface. When the peripheral end portion and the first surface are photographed to capture an image of their boundary and its surroundings, the position of the boundary can be easily ascertained from this captured image. If the joined portion is also formed with the tapered surface before joining, the position of the boundary between the peripheral end portion and the first surface can be easily determined and thus they are likely to be joined at an appropriate position. Therefore, the battery is completed with the first current collecting member and the second current collecting member appropriately joined to each other.

Another aspect of the present disclosure provides a method for producing a battery, the battery comprising: an outer casing; a power generating element housed in the outer casing; a first current collecting member connected to the power generating element; and a second current collecting member placed outside the outer casing, wherein either one of the first current collecting member and the second current collecting member to be used in the method includes a plate-shaped portion that has a first surface and a second surface opposite the first surface, and the other one of the first current collecting member and the second current collecting member to be used in the method includes: a through part extending through the outer casing; and a to-be-swaged part that is continuous to the through part and is to be swaged, the to-be-swaged part including a distal end portion provided with a tapered surface at an edge portion on one surface, the tapered surface being tapered with a depression amount that is smaller at a position closer to the through part, and the tapered surface has a maximum size that is: 0.1 mm or more in a direction from the distal end portion of the to-be-swaged part toward the through part; and 0.03 mm or more in a thickness direction of the to-be-swaged part, and wherein the method comprises: placing the one of the first current collecting member or the second current collecting member, having the plate-shaped portion, so that the plate-shaped portion extends along the outer casing with the second surface facing the outer casing; placing the other one of the first current collecting member or the second current collecting member, having the through part, so that the through part extends through the outer casing and the to-be-swaged part protrudes beyond a level of the first surface of the plate-shaped portion; swaging the to-be-swaged part so that the one surface of the to-be-swaged part provided with the tapered surface faces the first surface of the plate-shaped portion to form a contact part which contacts the first surface; irradiating light onto the contact part and a part of the first surface not covered by the contact part to capture an image including an end portion of the contact part; and joining the contact part and the first surface at a position of the end portion of the contact part, the position being ascertained from the image.

In the battery producing method configured as above, either the first current collecting member or the second current collecting member includes the plate-shaped portion, and the other one includes the to-be-swaged part which is a target portion of swaging. This to-be-swaged part is provided, at its distal end portion, with the tapered surface in advance. This tapered surface is caused to face the first surface of the plate-shaped portion by the swaging, so that a gap is likely to be formed between the plate-shaped portion and the contact part after swaging. In this condition, an image of the contact part and the part of the first surface not covered by the contact part is captured by light irradiation. The gap forms a shadow in the captured image, allowing the position of the peripheral end portion of the contact part can be easily determined. Thus, the contact part and the first surface can be appropriately joined to each other.

DETAILED DESCRIPTION OF THE EXEMPLARY EMBODIMENTS

Figure 1:
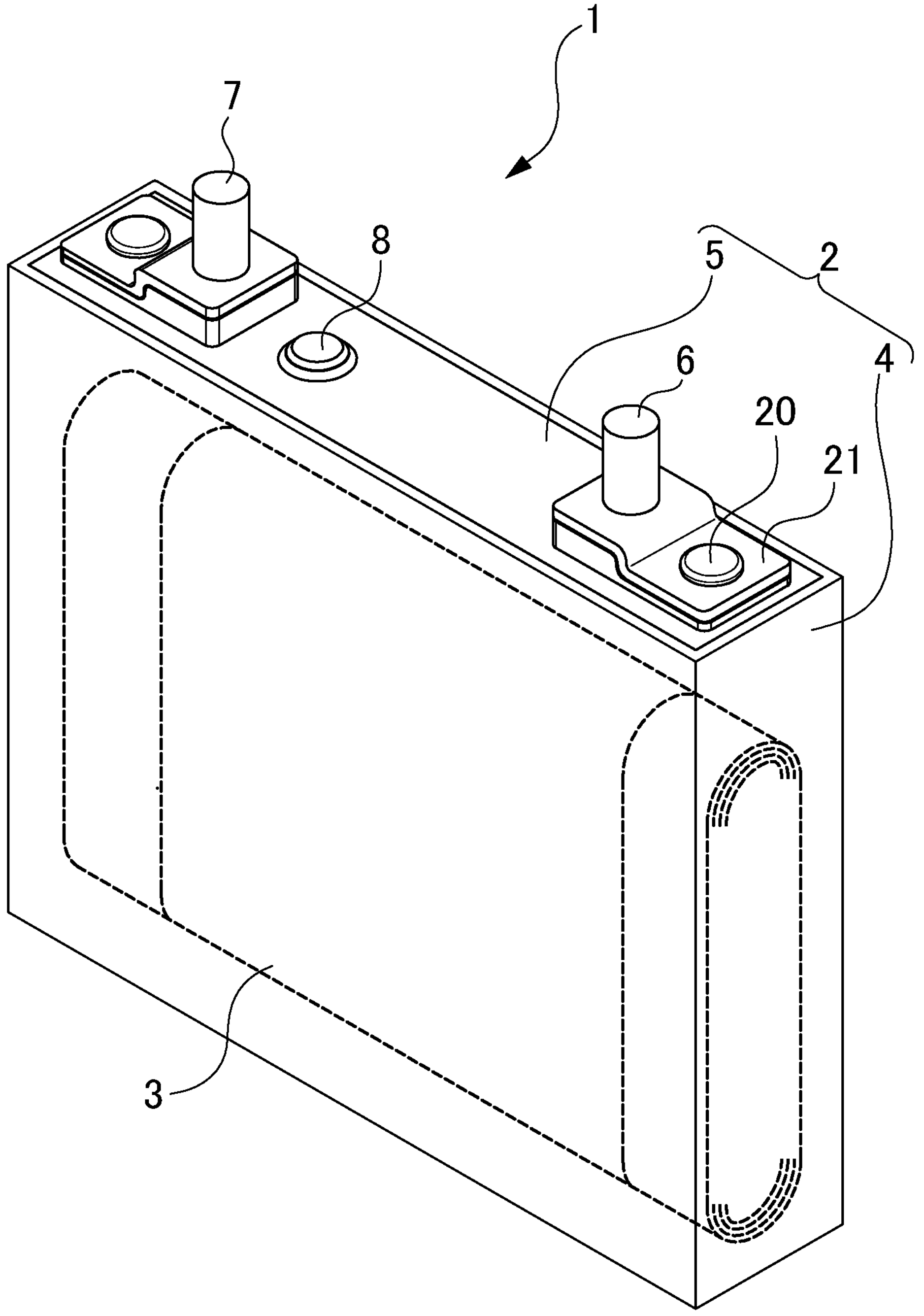
FIG. 1 is a perspective view of a battery in an embodiment.

A detailed description of an embodiment of the present disclosure will now be given referring to the accompanying drawings. In the present embodiment, this disclosure is embodied as a battery 1 shown in FIG. 1. The battery 1 in FIG. 1 includes an outer casing 2 and a power generating element 3 housed in the outer casing 2. The power generating element 3 is a laminated body of positive and negative electrode plates or sheets.

The outer casing 2 consists of a casing body 4 and a lid 5. The power generating element 3 is housed in the casing body 4. The lid 5 is provided with external terminals 6 and 7, and a sealing cap 8. These external terminals 6 and 7 are individually connected to either the positive electrode sheet or the negative electrode sheet of the power generating element 3 within the outer casing 2. The sealing cap 8 closes a liquid inlet provided in the lid 5. An outer plate 21 is a flat-plate-shaped member integrally connected to the external terminal 6. This outer plate 21 is attached to the lid 5 with a rivet 20. The external terminal 6 is electrically connected to the rivet 20 through the outer plate 21, as described in detail below.

Figure 2:
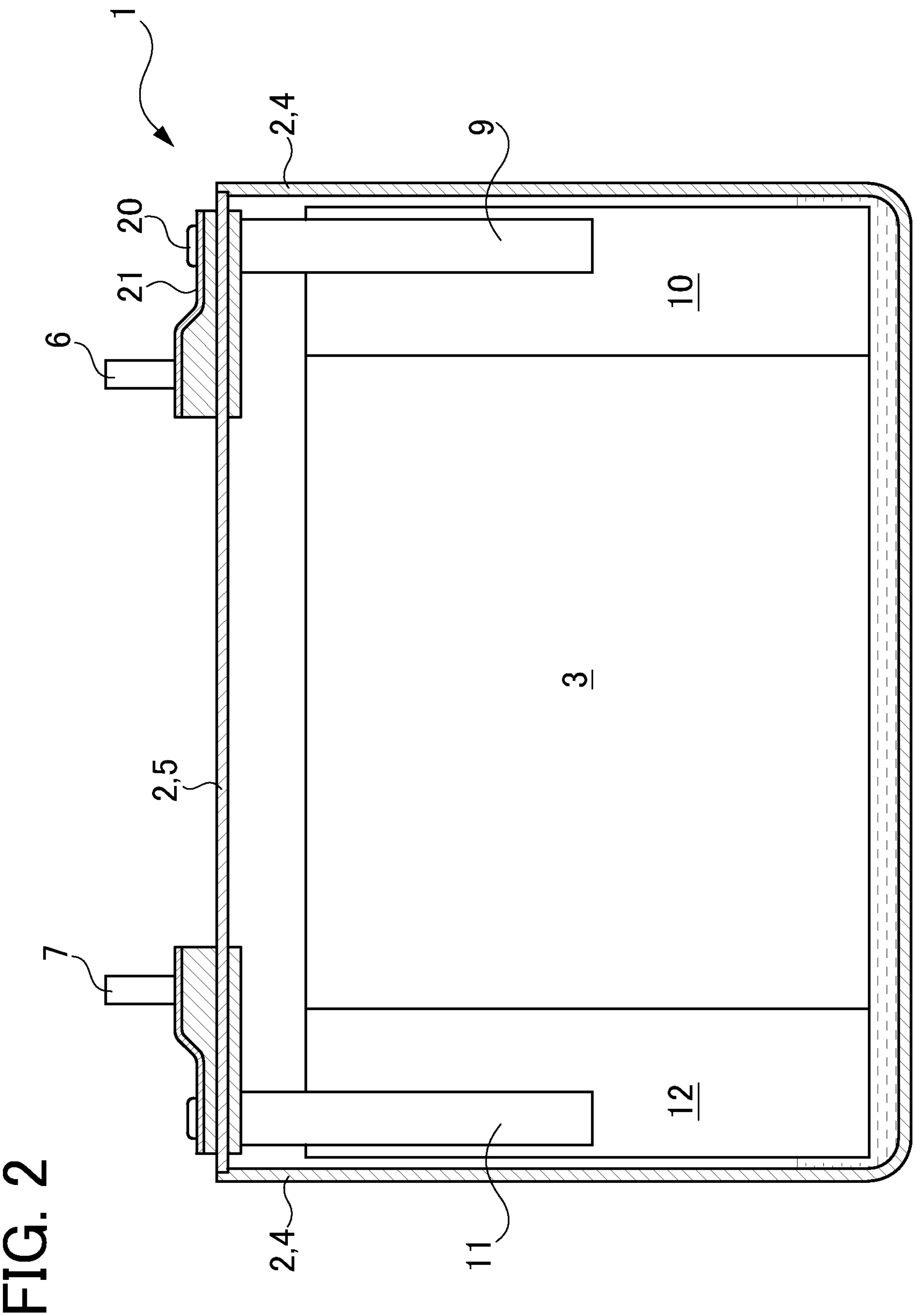
FIG. 2 is a front view of the battery including a partial cross-section in the present embodiment.

The battery 1 is internally provided with a current collecting member 9 and a current collecting member 11, as shown in FIG. 2. Specifically, the current collecting member 9 is connected to a negative electrode sheet 10 and the current collecting member 11 is connected to a positive electrode sheet 12. The current collecting member 9 provides electrical conduction between the external terminal 6 and negative electrode sheet 10. The current collecting member 11 provides electrical conduction between the external terminal 7 and the positive electrode sheet 12.

Figure 3:
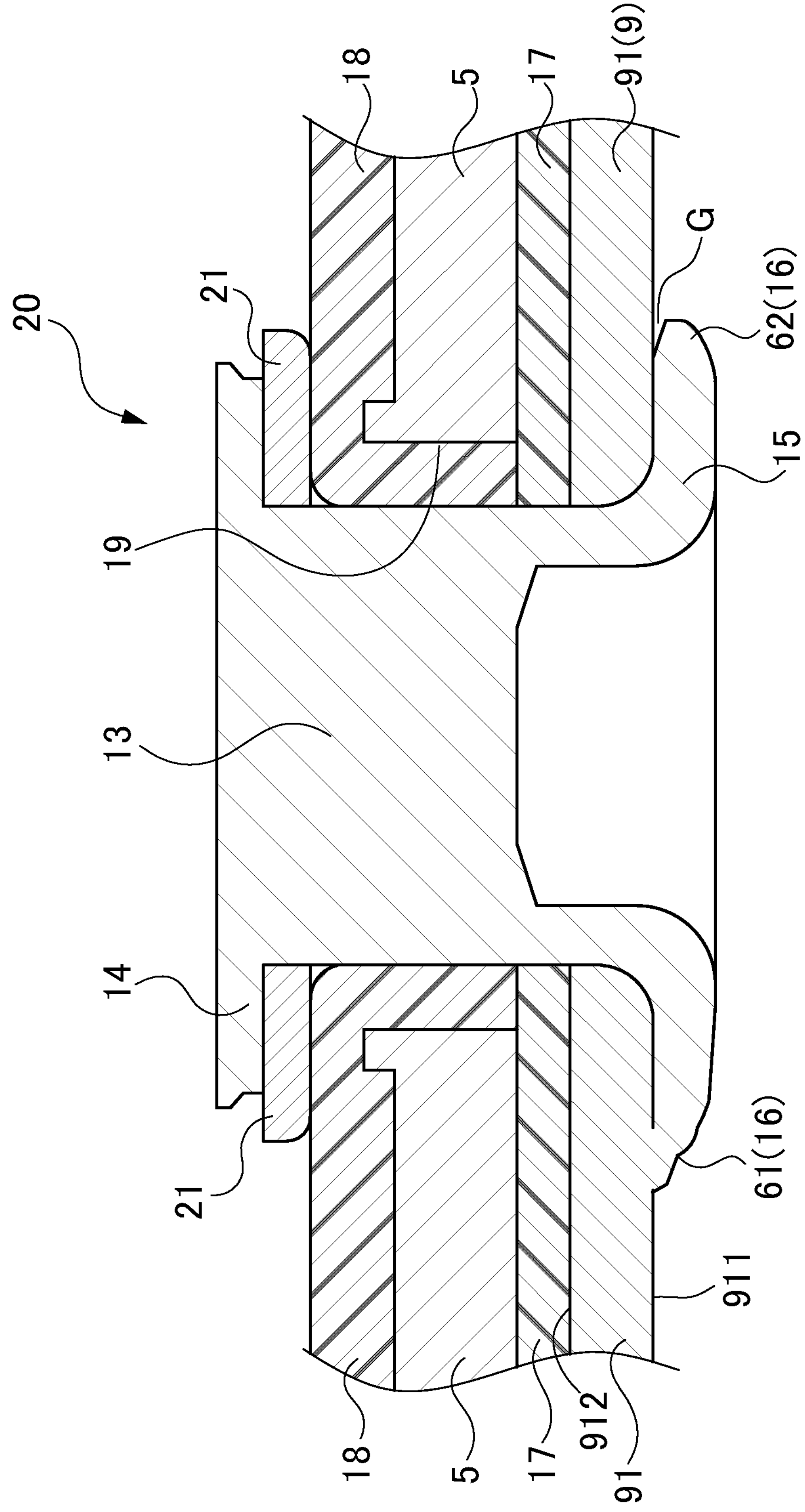
FIG. 3 is a cross-sectional view showing a structure of a rivet and its surroundings of the battery in the present embodiment.

The essential feature of the battery 1 in the present embodiment is the connecting configuration between the current collecting member 9 and external terminal 6, more specifically, the joining configuration between the current collecting member 9 and the rivet 20. FIG. 3 is a cross-sectional view showing the structure of the rivet 20 and its surroundings. The rivet 20 in FIG. 3 includes a through part 13, a flange part 14, a contact part 15, and a peripheral end portion 16. In FIG. 3, additionally, the current collecting member 9, the lid 5, the outer plate 21, an insulation member 17, and an insulation member 18 are partially illustrated. In the configuration shown in FIG. 3, the current collecting member 9 is one example of a first current collecting member of the present disclosure, and the rivet 20 or a combination of the rivet 20 and the outer plate 21 is one example of a second current collecting member of the present disclosure.

The lid 5 is formed with a hole 19 for attachment of the rivet 20. Furthermore, the current collecting member 9, the insulation members 17 and 18, and the outer plate 21 are formed with holes at a position aligned with the hole 19. In FIG. 3, each of the lid 5, the current collecting member 9, the insulation members 17 and 18, and the outer plate 21 is one continuous body, even though their reference signs are assigned to both left and right sides. In FIG. 3, the upper side above the lid 5 corresponds to the outside of the outer casing 2 of the battery 1, and the lower side under the lid 5 corresponds to the inside of the outer casing 2.

The current collecting member 9 includes a plate-shaped portion 91 placed along the lid 5. This plate-shaped portion 91 is illustrated in FIG. 3. The plate-shaped portion 91 has a first surface 911 that contacts the contact part 15 of the rivet 20, which is a lower surface in FIG. 3. Further, the plate-shaped portion 91 has a second surface 912 that faces the lid 5, which is an upper surface opposite the first surface 911 in FIG. 3.

The through part 13 of the rivet 20 is placed in the hole 19 of the lid 5 and extends through the lid 5. The flange part 14 is placed at one end of the through part 13 and located on the outside of the lid 5, and has a larger diameter than the through part 13. The contact part 15 is provided continuous to and at the other end of the through part 13, and located on the inside of the lid 5, and has a larger diameter than the through part 13. The flange part 14 and the contact part 15 are larger than the hole 19 in diameter.

As shown in FIG. 3, portions of the outer plate 21, lid 5, and plate-shaped portion 91 of the current collecting member 9 are sandwiched between the contact part 15 and the flange part 14 of the rivet 20. Thus, the rivet 20 is fixed at a position of the hole 19 of the lid 5. The flange part 14 is in tight contact with the outer plate 21. In other words, the external terminal 6 and the current collecting member 9 are electrically connected to each other by close contact between the contact part 15 and the plate-shaped portion 91 and close contact between the flange part 14 and the outer plate 21. The current collecting member 9 is connected to the negative electrode sheet 10 as described above and thus the external terminal 6 and the negative electrode sheet 10 are electrically connected through the rivet 20.

However, between the contact part 15 and the flange part 14, there are sandwiched the insulation members 17 and 18 in addition to the outer plate 21, lid 5, and current collecting member 9. The insulation member 17 serves to insulate the current collecting member 9 from the lid 5, while the insulation member 18 serves to insulate the outer plate 21 from the lid 5. Accordingly, the lid 5 is insulated from the outer plate 21 and the current collecting member 9.

Next, a contact site between the contact part 15 of the rivet 20 and the plate-shaped portion 91 of the current collecting member 9 will be described below. The contact part 15 is an annular portion whose diameter is widened by swaging as described later, and includes a peripheral end portion 16 along its outer peripheral end. Specifically, this peripheral end portion 16 is an annular portion circumferentially extending along a radial end far from the through part 13. The peripheral end portion 16 includes a joined portion 61 joined to the first surface 911 of the plate-shaped portion 91. In FIG. 3, the joined portion 61 is shown on the left side and a non-joined portion 62 that is not joined to the first surface 911 is shown on the right side. Specifically, the peripheral end portion 16 includes the joined portion 61 and the non-joined portion 62. The current collecting member 9 and the rivet 20 are made of the same type of conductive material, and firmly joined to each other by the joined portion 61.

Figure 4:
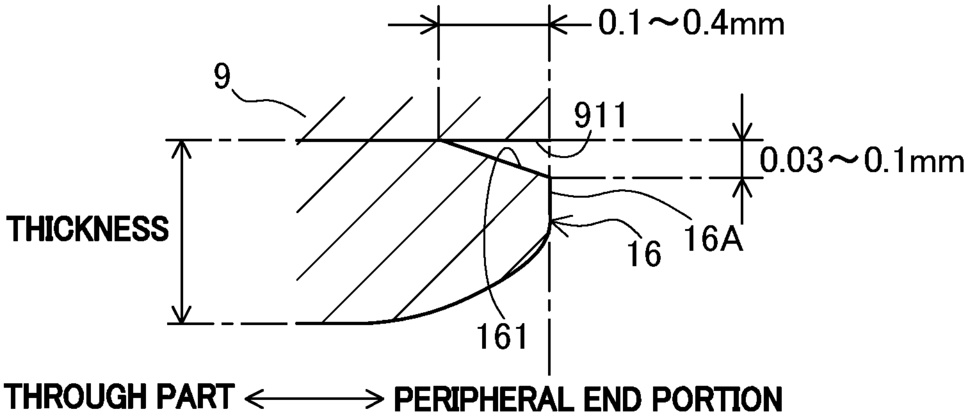
FIG. 4 is a cross-sectional view of a peripheral end portion of the battery.

The non-joined portion 62 of the peripheral end portion 16 includes a portion formed with a tapered surface as shown in FIG. 4. FIG. 4 is an enlarged view of the non-joined portion 62 shown in FIG. 3. As shown in FIG. 4, specifically, the peripheral end portion 16 includes an edge portion 161 at a radial outer end 16A, provided with a tapered surface apart from the first surface 911 with a gap G that is smaller at a position closer to the through part 13. The edge portion 161 with such a tapered surface is not in contact with the first surface 911 of the plate-shaped portion 91. In other words, in the battery 1 of the present embodiment, of the peripheral end portion 16 of the contact part 15 of the rivet 20, at least a part of the non-joined portion 62 is the edge portion 161, which is separated from the plate-shaped portion 91 of the current collecting member 9.

The tapered surface of the edge portion 161 in the present embodiment has a maximum size of 0.1 mm or more from the peripheral end portion 16 (i.e., the outer end 16A) in a direction toward the through part 13 and a maximum size of 0.03 mm or more in a thickness direction of the peripheral end portion 16, as shown in FIG. 4. The contact part 15 of the rivet 20 is formed into such a shape as shown in FIG. 3 by swaging, as described later. After swaging but before joining, a portion of the peripheral end portion 16, which is to be the joined portion 61 after joining, also includes the edge portion 161 having the tapered surface 31. For example, the peripheral end portion 16 may be provided with the edge portion 161 having the tapered surface 31 over the entire circumference. When light is irradiated onto the edge portion 161 provided with the tapered surface from the side toward the contact part 15, i.e., from below in FIG. 4, a shadow is likely to be made around the peripheral end portion 16.

As described later, the end portion of a rivet before swaging is provided with a tapered surface in advance. However, the peripheral end portion 16 of the rivet 20 may be deformed from its original shape due to swaging. In the rivet 20 of the battery 1, even the non-joined portion 62 does not always maintain the exact shape of the tapered surface of the rivet before swaging. That is, the maximum size of the tapered surface represents the size of a part of the entire peripheral end portion 16, where the tapered surface is maximum.

Furthermore, the maximum size of the tapered surface of the edge portion 161 in the present embodiment is 0.4 mm or less from the peripheral end portion 16 (i.e., the outer end 16A) in the direction toward the through part 13 and 0.1 mm or less in the thickness direction of the peripheral end portion 16, preferably. If the tapered surface of the edge portion 161 is too large, the contact area between the contact part 15 and the plate-shaped portion 91 tends to be small, which may affect the electrical conduction between them.

Next, a method for producing the battery 1 will be described below referring to a flowchart of FIG. 5. This method is performed using a rivet before swaging, the lid 5, the outer plate 21, the current collecting member 9, and the insulation members 17 and 18. In the following description, the rivet before swaging corresponds to a rivet 22 in FIG. 6. In the producing process in the present embodiment, an operator first stacks the above components in turn as shown in FIG. 6 (Step 1). Specifically, the outer plate 21, the insulation member 18, the lid 5, the insulation member 17, and the current collecting member 9 are stacked in this order on the flange part 14 of the rivet 22 so that the rivet 22 extends through their holes.

The rivet 22 before swaging includes a to-be-swaged part 24 which is a target portion to be swaged, a through part 25, and the flange part 14 as shown in FIG. 6. The flange part 14 is provided at one end of the through part 25 and has a larger diameter than the through part 25. The through part 25 includes a solid columnar portion 251 located on a side close to the flange part 14 and a cylindrical portion 252 located on a side far from the flange part 14 and continuous to the columnar portion 251. The to-be-swaged part 24 is provided continuous to and at the distal end of the cylindrical portion 252, and is subjected to swaging later. The to-be-swaged part 24 has a cylindrical shape having an inner surface 241 and an outer surface 242. The outer diameter of the outer surface 242 of the to-be-swaged part 24 is equal to the diameter of the through part 25.

FIG. 6 shows the above components upside down from FIG. 3 according to the actual situation during swaging. Accordingly, for the plate-shaped portion 91 of the current collecting member 9, the first surface 911 is located on the upper side and the second surface 912 is located on the lower side in FIG. 6. Specifically, the plate-shaped portion 91 is placed along the lid 5 of the outer casing 2 while the second surface 912 faces the lid 5.

In step 1, the to-be-swaged part 24 and the through part 25 are inserted in the holes of the current collecting member 9 and others members or parts. The through part 25 extends through the hole 19 of the lid 5. This through part 25 corresponds to the through part 13 of the rivet 20 after swaging. A part of the to-be-swaged part 24 protrudes upward beyond the level (i.e., the height) of the first surface 911 of the plate-shaped portion 91. This protruding portion (i.e., the to-be-swaged part 24) will be formed into the contact part 15 of the rivet 20 by swaging. The flange part 14 of the rivet 22 corresponds to the flange part 14 of the rivet 20 after swaging.

In FIG. 6, a punch 28, which is a processing tool for swaging, is also illustrated. This punch 28 includes a working surface 29 which is part of conical surface. During processing, the tip of the punch 28 is inserted in the opening of a distal end portion 26 of the to-be-swaged part 24 and then pushed down, causing the working plane 29 to press against the to-be-swaged part 24, which bends radially outward.

Figure 6:
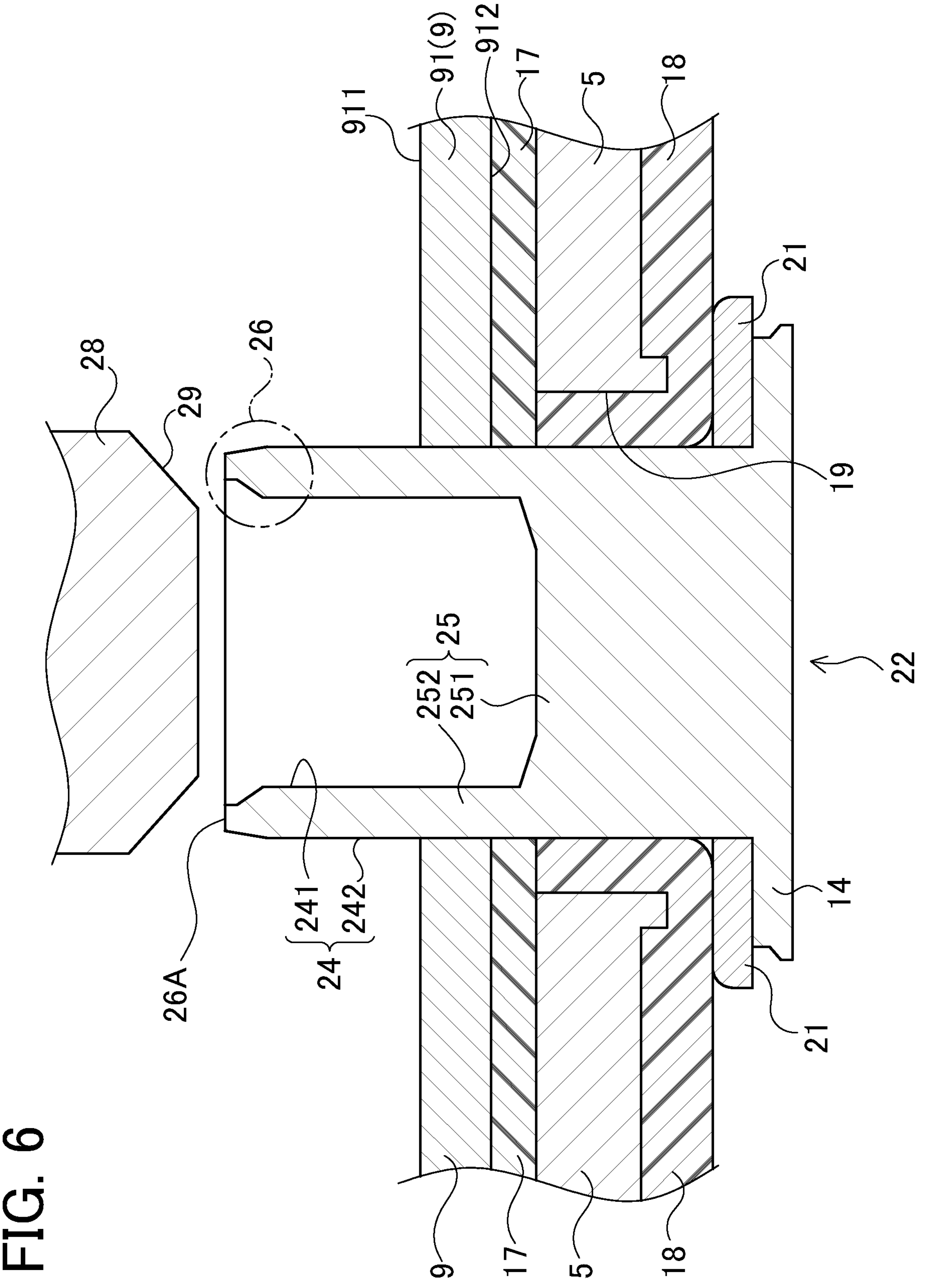
FIG. 6 is a cross-sectional view showing a rivet at a stage just before swaging.
Figure 7:
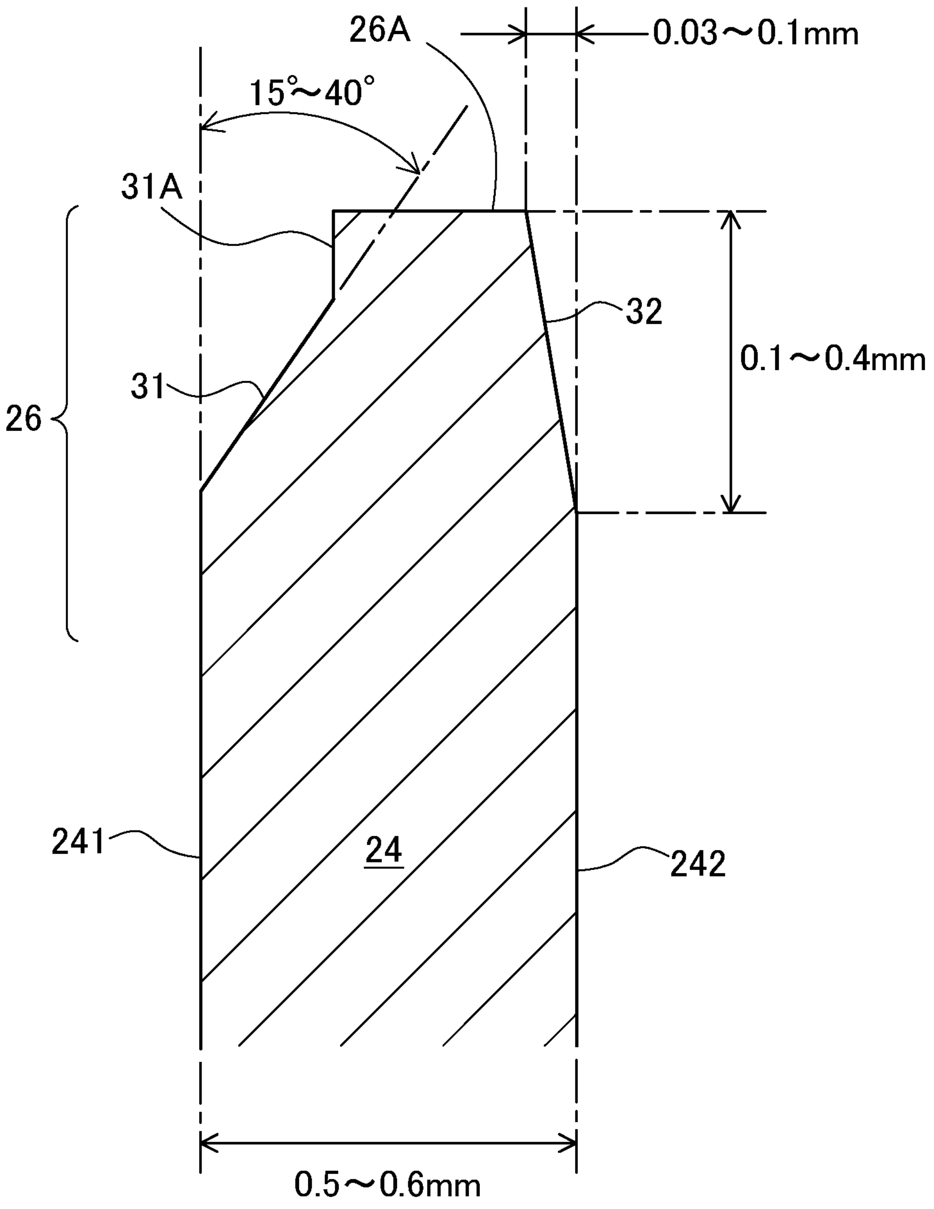
FIG. 7 is an enlarged cross-sectional view showing a distal end portion of a to-be-swaged part of the rivet, circled with a dash-dotted line in FIG. 6.

In the rivet 22 before swaging, the distal end portion 26 of the to-be-swaged part 24, located at the opposite end from the flange part 14, is formed with a tapered surface 31 on the inner surface 241 and a tapered surface 32 on the outer surface 242 as shown in FIG. 7. FIG. 7 is an enlarged cross-sectional view of the distal end portion 26 of the to-be-swaged part 24, corresponding to an area circled with a dash-dotted line in FIG. 6. The inner surface 241 of the to-be-swaged part 24 contacts the working surface 29 of the punch 28 during subsequent swaging. The outer surface 242 of the to-be-swaged part 24 is made to contact the plate-shaped portion 91 by swaging. The tapered surface 32 of the outer surface 242 is one example of a tapered surface provided in the distal end portion 26 of the to-be-swaged part 24 at an edge portion on one surface side (i.e., the outer surface 242).

The tapered surface 31 of the inner surface 241 is formed as a truncated conical surface over the entire circumference of the to-be-swaged part 24 in order to allow the to-be-swaged part 24 to be appropriately plastically deformed by swaging. The inner surface 241 of the rivet 22 in the present embodiment is formed with a tapered surface 31 at a taper angle of 15° to 40°. The tapered surface 31 may be formed to the leading end 26A of the distal end portion 26 or the distal end portion 26 may include an area formed with no tapered surface 31A, as shown in FIG. 7. The wall thickness of the to-be-swaged part 24 is constant, except for the distal end portion 26, and may be 0.5 to 0.6 mm.

In contrast, the tapered surface 32 of the outer surface 242 is tapered with a depressed amount that is smaller at a position closer to the through part 25, as shown in FIG. 7, so that the tapered surface 32 has a size of 0.1 mm or more from the leading end 26A of the to-be-swaged part 24 in the direction toward the through part 25 and 0.03 mm or more in the thickness direction of the to-be-swaged part 24. The depressed amount indicates a radial distance from the extension of the outer surface 242. The tapered surface 32 of the outer surface 242 may be formed continuously over the entire periphery or may partially include a non-tapered surface. In other words, the tapered surface 32 may be formed on only a part of the outer surface 242, for example, on a half circumferential part. The maximum size of the tapered surface 32 of the rivet 22 before swaging indicates the size of a specified part of the outer surface 242, where the tapered surface 32 is formed.

The tapered surface 32 of the rivet 22 in the present embodiment is 0.4 mm or less from the leading end 26A of the to-be-swaged part 24 in the direction toward the through part 25 and 0.1 mm or less in the thickness direction of the to-be-swaged part 24, as shown in FIG. 7. The tapered surface 32 is intended to create a gap G between the contact part 15 and the plate-shaped portion 91 in the battery 1 as described above and therefore an excessive gap is not preferable. Consequently, since the tapered surface 32 has the above-defined size, it is expected to create a gap G with an appropriate dimension by swaging.

Figure 5:
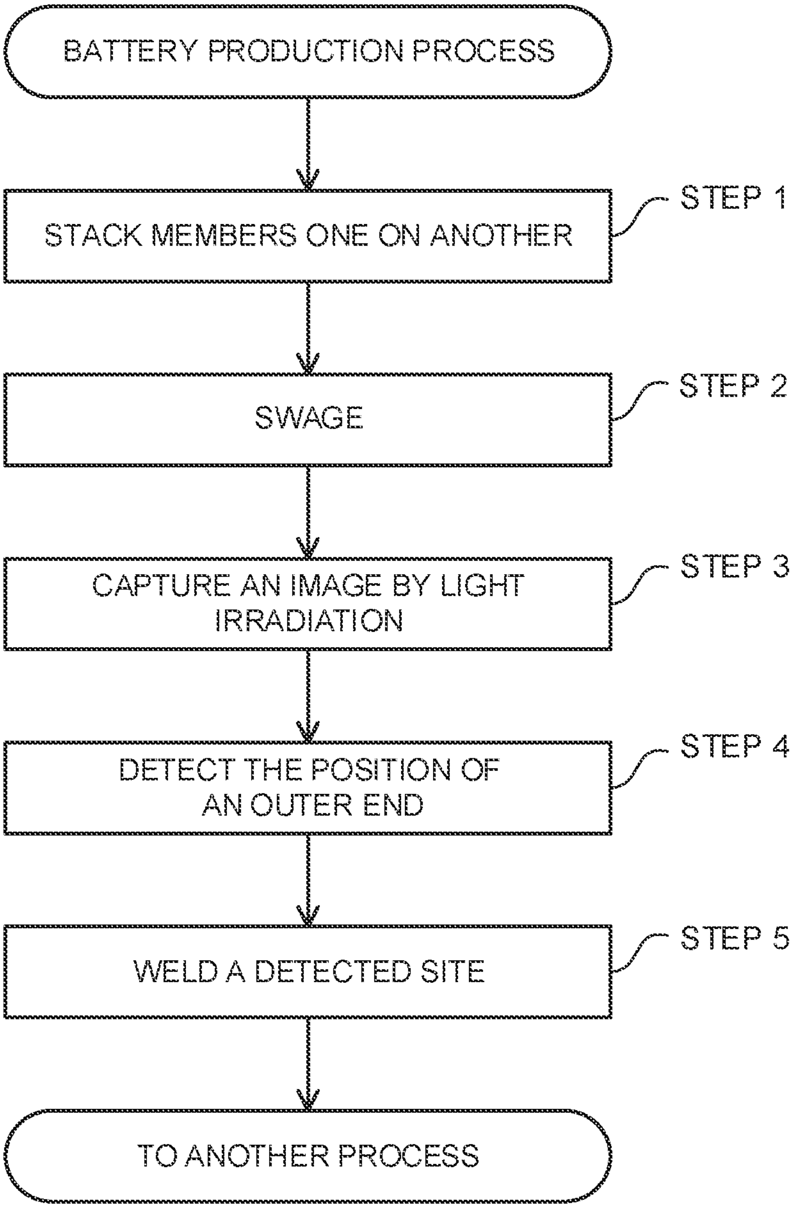
FIG. 5 is a flowchart showing the process of a method for producing the battery in the present embodiment.
Figure 8:
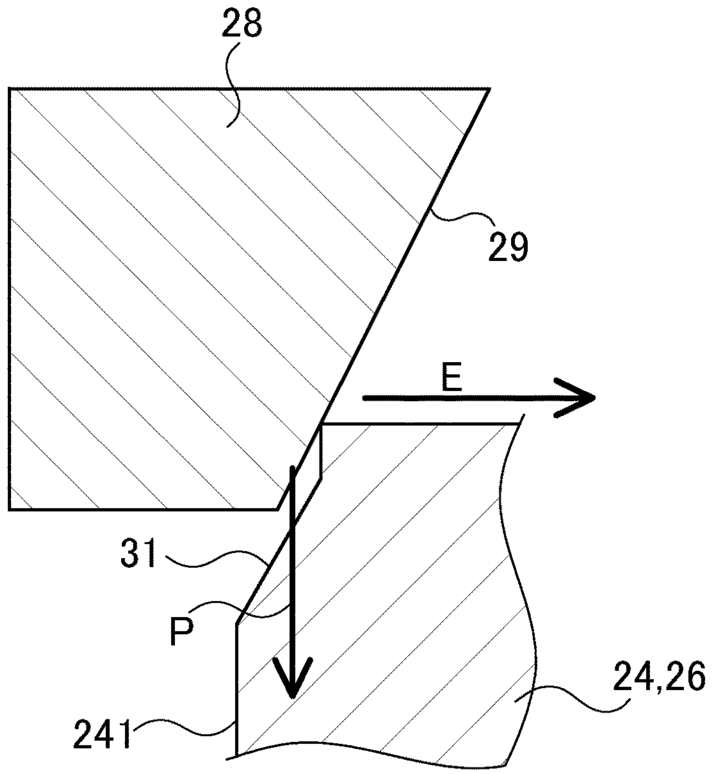
FIG. 8 is an explanatory diagram showing the placement of a punch and a to-be-swaged part during swaging.
Figure 9:
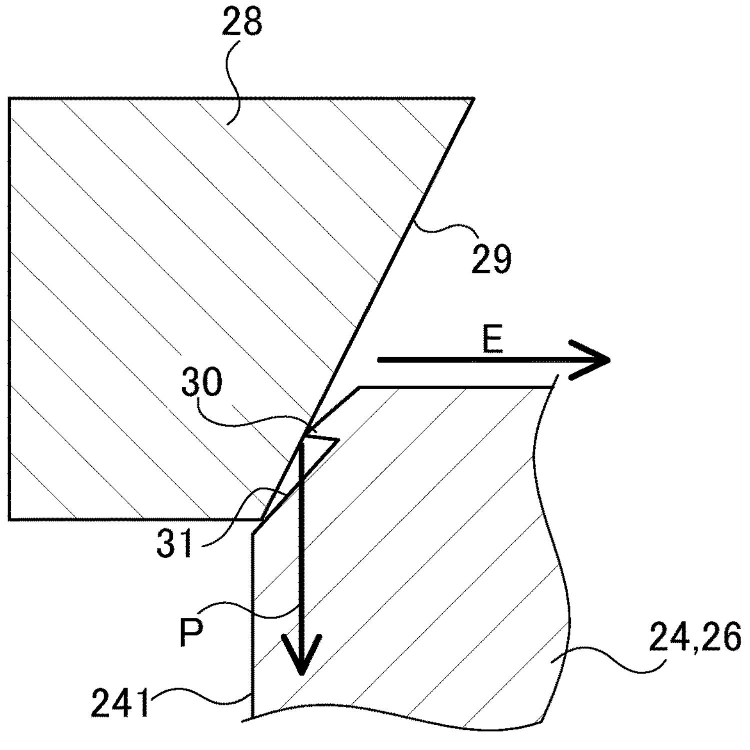
FIG. 9 is another explanatory diagram showing the placement of the punch and the to-be-swaged part during swaging.

Returning to the process in FIG. 5, the outer plate 21 and others are set as shown in FIG. 6 and then the to-be-swaged part 24 of the rivet 22 is plastically deformed by swaging (Step 2). Specifically, as shown in FIG. 8, the punch 28 is pushed downward as indicated by an arrow P, causing the working surface 29 of the punch 28 to press out the leading end of the inner surface 241 in a radial direction indicated by an arrow E. When the punch 28 is further pushed downward, a projecting portion 30 is generated in the distal end portion 26 at a position near the inner shoulder of the inner surface 241 as shown in FIG. 9. Since the tapered surface 31 exists below this projecting portion 30 in the figure, the projecting portion 30 is absorbed by the tapered surface 31 as the punch 28 is further pushed down from the position in FIG. 9, so that burr occurrence is suppressed.

By the swaging in step 2, the to-be-swaged part 24 of the rivet 22 including the distal end portion 26 is pushed radially outward, pressing the outer surface 242 against the first surface 911 of the plate-shaped portion 91. The to-be-swaged part 24, plastically deformed by swaging, becomes the contact part 15 as shown on the right side in FIG. 3. After swaging, therefore, the rivet 20 is in a state where the flange part 14 and the contact part 15 sandwich therebetween the current collecting member 9 and other components.

Subsequently, the operator irradiates light onto the contact part 15 of the rivet 20 to capture an image of the area including the peripheral end portion 16 which is a radial outer end portion of the contact part 15 and a part of the first surface 911, around the peripheral end portion 16 and uncovered with the contact part 15 (Step 3). Since the punch 28 does not contact the outer surface 242 of the rivet 22 during swaging, the tapered surface 32 of the outer surface 242 of the rivet 22 before swaging is partly maintained even after swaging and forms the edge portion 161 as shown in FIG. 4. Specifically, a gap G defined by the edge portion 161 exists between the plate-shaped portion 91 of the current collecting member 9 and the peripheral end portion 16 of the rivet 20. Therefore, when light is irradiated onto the the contact part 15 from below in FIG. 3, the plate-shaped portion 91 of the current collecting member 9 and the contact part 15 of the rivet 20 shine by reflecting the light, while a shadow is generated around the peripheral end portion 16. The thus captured image 70 in step 3 includes for example a darker shadow image 71 around the boundary between the peripheral end portion 16 and the plate-shaped portion 91 than on other portions, as shown in FIG. 10(A).

By the image processing based on the image 70 captured in step 3, the operator detects the position of the outer end 16A of the peripheral end portion 16 (Step 4). For instance, using the edge detection technique based on brightness/darkness of an image, the position of the boundary edge between the peripheral end portion 16 and the shadow image 71 surrounding thereof is obtained as shown in FIG. 10(B). This position indicates the position of the outer end 16A of the peripheral end portion 16. Since the shadow image 71 is included in the captured image, the position of the outer end 16A of the peripheral end portion 16 can be easily ascertained and thus the position of the targets for joining can be accurately detected.

Furthermore, the operator performs welding at the outer end 16A of the peripheral end portion 16 detected in step 4 to join the contact part 15 to the first surface 911 of the plate-shaped portion 91 (Step 5). To be specific, as shown in FIG. 10(C), the operator performs spot welding at a plurality of welding sites 72 along the outer end 16A captured from the image. This welding forms the joined portion 61 as shown on the left side in FIG. 3, joining the contact part 15 of the rivet 20 to the first surface 911 of the current collecting member 9. Thus, the external terminal 6 and the negative electrode sheet 10 are appropriately electrically connected through the current collecting member 9.

Thereafter, the operator performs subsequent processes. Specifically, the operator assembles the current collecting member 11 in the same manner as above. Further, the operator inserts the power generating element 3 into the casing body 4 of the outer casing 2, joins the casing body 4 and the lid 5, and injects an electrolyte into the casing body 4. Thus, the battery 1 is completed.

The battery 1 in the present embodiment described in detail above includes the current collecting member 9 connected to the power generating element 3 and the rivet 20 connected to the external terminal 6. The first surface 911 of the plate-shaped portion 91 of the current collecting member 9 and the contact part 15 of the rivet 20 are joined to each other through the joined portion 61. In contrast, in the non-joined portion 62 of the contact part 15, the edge portion 161 of the peripheral end portion 16 has a tapered surface, creating a gap G between the peripheral end portion 16 and the first surface 911 of the current collecting member 9. When the boundary between the peripheral end portion 16 and the first surface 911 including its surroundings are photographed, it is possible to easily ascertain the position of the boundary between the peripheral end portion 16 and the first surface 911 based on the shadow image 71 generated by the gap G. Since the joined portion 61 before joining is provided with the same tapered surface as the non-joined portion 62, it is easy to identify the target position for joining, so that the battery 1 is completed with the peripheral end portion 16 and the first surface 911 appropriately joined at the position of their boundary.

The foregoing embodiments are mere examples and give no limitation to the present disclosure. The present disclosure may be embodied in other specific forms without departing from the essential characteristics thereof. For example, in the foregoing embodiment, the technique of the present disclosure is applied to the external terminal 6 (the negative electrode terminal) as a target portion of the battery 1, but may be applied to the external terminal 7 (the positive electrode terminal) or both external terminals. In many cases, as the general materials of rivets, copper is used for a negative electrode terminal and aluminum is used for a positive electrode terminal. In this case, it is higher meaningful to apply the present disclosure to the negative electrode terminal made of copper more rigid than aluminum than to the positive electrode terminal. Further, the present disclosure can be applied to every type of battery.

The shape of the rivet 22, except for the distal end portion 26 of the to-be-swaged part 24, is not limited to the above-mentioned examples. For example, the depth of the hole of the to-be-swaged part 24 may selected with some degree of freedom. Further, the hole of the to-be-swaged part 24 may have a V-shaped cross-section with the inner diameter smaller at a position closer to the through part 25. The shape of the flange part 14 is also selected arbitrarily.

The rivet 22 and the external terminal 6 may be an integral piece. The rivet 22 may be configured such that the flange part 14 is positioned inside the outer casing 2 of the battery 1 and the to-be-swaged part 24 is swaged outside the outer casing 2. In other words, the first current collecting member and the second current collecting member may be located at reversed positions from the foregoing embodiment. The shape of the projecting portion 30 illustrated in FIG. 9 is a mere example. The shape of the projecting portion 30 appearing during processing differs for each rivet. In some cases, such a projecting portion 30 may not appear.

Figure 10:
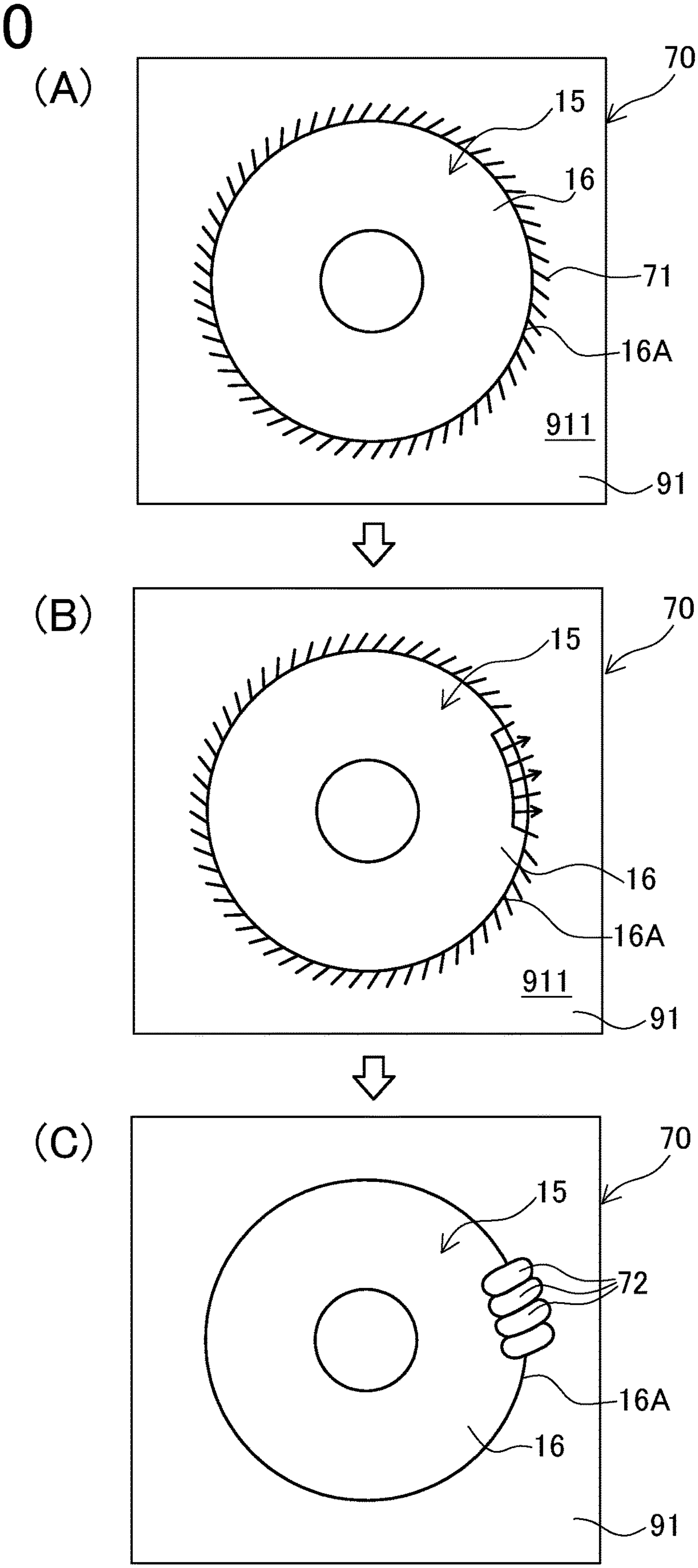
FIG. 10 is an explanatory diagram showing the process of capturing an image and joining.

FIG. 10 shows one example of the image of the contact part 15 over the entire circumference, but it does not have to be the entire circumferential image. For example, if only a part of the contact part 15, such as a half circumferential part, is to be welded, it is sufficient to capture an image including such a target area for welding. The contact part 15 may be joined over its entire circumference to the current collecting member 9. The joining method is not limited to welding.

The battery according to the present disclosure may be configured such that the maximum size of the tapered surface is: 0.4 mm or less in the direction from the peripheral end portion toward the through part; and 0.1 mm or less in the thickness direction of the peripheral end portion. If the maximum size of the tapered surface is too large, the joining area may become small or the joining may become unstable. With the tapered surface having an appropriate maximum size or less, the battery can be completed with reliably joined parts.

The battery according to the present disclosure may be configured such that the first current collecting member and the second current collecting member are made of the same kind of conductive material. Those first and second current collecting members made of the same kind of conductive material can be appropriately joined to each other by welding.

The battery according to the present disclosure may be configured such that at least a part of the through part is a columnar portion, the to-be-swaged part is a cylindrical portion continuous to the columnar portion, the tapered surface is formed at the edge portion of an outer surface corresponding to the one surface of the distal end portion of the cylindrical portion, and the swaging is performed to radially press out a part of the cylindrical portion including the distal end portion so that the outer surface of the cylindrical portion contacts the first surface of the plate-shaped portion. This method enables to make the to-be-swaged part including the tapered surface contact with the first surface of the plate-shaped portion.

The present disclosure according to the above configurations can achieve a battery in which constituent members or parts are joined appropriately at their boundaries, and a method for producing the battery.

REFERENCE SIGNS LIST

1 Battery
2 Outer casing
3 Power generating element
9, 11 Current collecting member
13 Through part
15 Contact part
16 Peripheral end portion
20 Rivet (After processing)
22 Rivet (Before processing)
24 To-be-swaged part
25 Through part
91 Plate-shaped portion
161 Edge portion

What is claimed is:

1. A method for producing a battery, the battery comprising:

an outer casing;

a power generating element housed in the outer casing;

a first current collecting member connected to the power generating element; and a second current collecting member placed outside the outer casing, wherein either one of the first current collecting member and the second current collecting member to be used in the method includes a plate-shaped portion that has a first surface and a second surface opposite the first surface, and the other one of the first current collecting member and the second current collecting member to be used in the method includes:

a through part extending through the outer casing; and a to-be-swaged part that is continuous to the through part and is to be swaged, the to-be-swaged part including a distal end portion provided with a tapered surface at an edge portion on one surface, the tapered surface being tapered with a depression amount that is smaller at a position closer to the through part, and the tapered surface has a maximum size that is:

0.1 mm or more in a direction from the distal end portion of the to-be-swaged part toward the through part; and 0.03 mm or more in a thickness direction of the to-be-swaged part, and wherein the method comprises:

placing the one of the first current collecting member or the second current collecting member, having the plate-shaped portion, so that the plate-shaped portion extends along the outer casing with the second surface facing the outer casing;

placing the other one of the first current collecting member or the second current collecting member, having the through part, so that the through part extends through the outer casing and the to-be-swaged part protrudes beyond a level of the first surface of the plate-shaped portion;

swaging the to-be-swaged part so that the one surface of the to-be-swaged part provided with the tapered surface faces the first surface of the plate-shaped portion to form a contact part which contacts the first surface;

irradiating light onto the contact part and a part of the first surface not covered by the contact part to capture an image including an end portion of the contact part; and joining the contact part and the first surface at a position of the end portion of the contact part, the position being ascertained from the image.

2. The method for producing a battery according to claim 1, wherein at least a part of the through part is a columnar portion, the to-be-swaged part is a cylindrical portion continuous to the columnar portion, the tapered surface is formed at the edge portion of an outer surface corresponding to the one surface of the distal end portion of the cylindrical portion, and the swaging is performed to radially press out a part of the cylindrical portion including the distal end portion so that the outer surface of the cylindrical portion contacts the first surface of the plate-shaped portion.

3. The method for producing a battery according to claim 1, wherein:

the plate-shaped portion is placed along the outer casing with the second surface facing the outer casing, the contact part includes a peripheral end portion that is located apart from the through part and includes a portion joined to the first surface of the plate-shaped portion, the peripheral end portion further includes a non-joined portion not joined to the first surface of the plate-shaped portion, the non-joined portion including an edge portion located on a side facing the first surface and provided with a tapered surface generating a gap with respect to the first surface so that the gap is smaller at a position closer to the through part, the tapered surface of the non-joined portion has a maximum size that is:

0.1 mm or more in a direction from the peripheral end portion toward the through part; and 0.03 mm or more in a thickness direction of the peripheral end portion.

4. The method for producing a battery according to claim 3, wherein: the maximum size of the tapered surface of the non-joined portion is:

0.4 mm or less in the direction from the peripheral end portion toward the through part; and 0.1 mm or less in the thickness direction of the peripheral end portion.

* * * * *